(12) United States Patent
Kennedy et al.

(10) Patent No.: US 6,214,937 B1
(45) Date of Patent: Apr. 10, 2001

(54) STAR-BLOCK POLYMERS HAVING MULTIPLE POLYISOBUTYLENE-CONTAINING DIBLOCK COPOLYMER ARMS RADIATING FROM A SILOXANE CORE AND METHOD FOR THE SYNTHESIS THEREOF

(75) Inventors: Joseph P. Kennedy, Akron, OH (US); Jung S. Shim, KyungKi-do (KR)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/280,790

(22) Filed: Mar. 26, 1999

(51) Int. Cl.[7] ............................. C08L 83/10; C08L 83/04
(52) U.S. Cl. ..................... 525/100; 525/106; 525/479; 528/15; 528/25; 528/31
(58) Field of Search .................................. 525/100, 106, 525/479; 528/15, 25, 31

(56) References Cited

U.S. PATENT DOCUMENTS

| | | | |
|---|---|---|---|
| 4,803,244 | * 2/1989 | Umpleby | 525/105 |
| 5,409,995 | * 4/1995 | Iwahara et al. | 525/100 |
| 5,663,245 | 9/1997 | Kennedy et al. | 525/479 |
| 5,804,664 | 9/1998 | Kennedy et al. | 525/314 |
| 5,810,705 | * 9/1998 | Mimura et al. | 492/56 |
| 5,856,392 | 1/1999 | Kennedy et al. | 525/479 |

\* cited by examiner

*Primary Examiner*—Robert Dawson
*Assistant Examiner*—Jeffrey B. Robertson
(74) *Attorney, Agent, or Firm*—Renner, Kenner, Greive, Bobak, Taylor & Weber

(57) ABSTRACT

The synthesis and characterization of novel multi-arm, polyisobutylene-based star-block polymers comprising a plurality of polyisobutylene-containing, diblock arms radiating from a siloxane core are described. The synthesis has been achieved by cationically polymerizing a monomer, such as styrene, and isobutylene to form diblock prearms and then hydrosilating the unsaturation-functionalized polyisobutylene with siloxanes carrying a plurality of Si—H groups via hydrosilation. The resultant star-block polymers may be thermoplastic elastomers characterized as having superior tensile strength and processing properties as compared to linear triblock polymers of similar hard/soft segments.

24 Claims, 7 Drawing Sheets

STAR-BLOCK POLYMERS HAVING MULTIPLE POLYISOBUTYLENE-CONTAINING DIBLOCK COPOLYMER ARMS RADIATING FROM A SILOXANE CORE AND METHOD FOR THE SYNTHESIS THEREOF

The research disclosed in this application was at least partially supported by the National Science Foundation under Grant 94-23202.

TECHNICAL FIELD

This invention relates generally to star polymers and, more particularly, to star-block polymers. Even more particularly, this invention relates to star-block polymers having multiple, well-defined arms of polyisobutylene-containing diblock copolymer emanating from well-defined cores of siloxane, and preferably, cyclosiloxanes. Specifically, the invention relates to the synthesis of star-shaped polyisobutylene-polystyrene diblock copolymers via the "arm first" method by linking polyisobutylene-polystyrene diblock prearms with multi-functional hydrogen cyclosiloxanes via hydrosilation.

BACKGROUND OF THE INVENTION

The synthesis of various multi-arm radial or star polymers have become of growing practical and theoretical interest to a variety of industries. Such star polymers are seen as useful as, *inter alia*, surfactants, lubricants, rheology modifiers, and viscosity modifiers. In fact, star polymers are now considered by many to be state-of-the-art viscosity modifiers and oil additives, although the potential of some of these star polymers for these applications is still being evaluated and tested.

It is well known that star polymers containing polyisobutylene arms of controlled length and hence, molecular weight, can be synthesized by living cationic polymerization. For example, Kennedy et al. U.S. Pat. No. 5,395,885 describes the synthesis of star polymers consisting of multiple polyisobutylene (PIB) arms and a polydivinylbenzene (PDVB) core. These star polymers suffer from the disadvantage that the core is "ill-defined". By the term "ill-defined" it is meant that the core of the star polymer, e.g., PDVB, is an uncontrolled, crosslinked, gel-like structure having unsaturation sites in the core. In comparison, "well-defined" cores are built of readily characterizable, soluble molecules which are precursors to the core. As a result, the structure of the resultant star polymers having well-defined cores can also be controlled.

In particular, star polymers having well-defined cores are believed to impart better resistance to mechanical/chemical degradation than star polymers having ill-defined cores. Examples of polyisobutylene star polymers prepared with such well-defined cores include those stars having polyisobutylene arms emanating from calixarene cores, cyclic condensation products of a p-substituted phenol and formaldehyde, and cyclosiloxane cores, both of which have been shown to provide superior properties as compared to polyisobutylenes emanating from PDVB cores. To date, patents containing polyisobutylene arms emanating from these well-defined cores include Kennedy et al. U.S. Pat. No. 5,663,245, using polysiloxane cores and Kennedy et al. U.S. Pat. No. 5,844,056, using calixarene cores.

Beyond the advantages described hereinabove, it is believed that resultant star polymers having polyisobutylene arms having well-defined cores, and particularly, cyclosiloxane cores as set forth in U.S. Pat. No. 5,663,245, will be more acid-base stable than other siloxane-containing compounds. For example, it is well known that Si—O groups are easily hydrolyzable in the presence of strong acids. That is, it is believed that the polyisobutylene arms of the subject polymer protect the Si—O groups from hydrolytic attack, thereby aiding in the acid-base stability of the polymer.

Cyclosiloxanes ($D_n^H$) are also seen as another potential solution to the existing problem of shear stability posed by star polymers having ill-defined cores. Silicone oils have long been demonstrated to have superior shear stability properties as compared to hydrocarbon oils (Fitzsimmons et al., in Trans. ASME 68,361 (1946)), leading Kennedy et al., in U.S. Pat. No. 5,663,245, to purpose the synthesis of first order stars having multiple arms of polyisobutylene (PIB) emanating from a cyclosiloxane ($D_n^H$) core.

By the term "first order" it is meant that the star polymers are essentially synthesized by linking, through hydrosilation, a number of olefin-terminated polyisobutylene prearms to the Si—H groups of a single cyclosiloxane molecule. In theory, the number of arms emanating from a first order star molecule will total the number of Si—H groups on the cyclosiloxane molecule. For example, in U.S. Pat. No. 5,663,245, Kennedy et al. describes a first order star with a hexamethylcyclosiloxane molecule ($D_6^H$) core having six Si—H groups, where a maximum of six polyisobutylene arms radiate from the molecule. These first order stars were formed by hydrosilation of, *inter alia*, ω-allyl-terminated polyisobutylene (PIB-CC=C) with methylcyclosiloxanes carrying 4 to 8 Si—H groups ($D_n^H$, where n=4 to 8).

The formation of higher order stars was also first described by Kennedy et al., in U.S. Pat. No. 5,856,392. In the course of investigating the multiple PIB-arm/cyclosiloxane core first order star polymers using $D_6^H$, it was observed by Kennedy et al,. that in the presence of trace amounts of water in the hydrosilation charges, a small number of stars had a higher number of arms than the expected six as the result of random core-core coupling.

"Higher order" stars may be envisioned as clusters of first-order star polymers linked together by their siloxane cores. Theoretically, the core component of a "higher order" star polymer has many more Si—H groups available for linkage to olefin-terminated polyisobutylene prearms. This is true because the core component in higher order stars includes a plurality of individual cyclosiloxane molecules coupled together, and only one reactive site is needed to couple two cyclosiloxanes, leaving many times more Si—H groups available for linkage than are present on any one individual cyclosiloxane molecule.

The present invention continues and improves this art relating to star polymers having polyisobutylene arms radiating from a well-defined siloxane core. In particular, it will be appreciated that both U.S. Pat. No. 5,663,245 and U.S. Pat. No. 5,856,392 focus on the synthesis of the polyisobutylene arms to a siloxane core, whether the core be one siloxane molecule (i.e., U.S. Pat. No. 5,663,245) or several (i.e., U.S. Pat. No. 5,856,392) in the formation of "first order" and "higher order" stars, respectively. Neither patent suggests that the prearms of polyisobutylene could instead be polymerized diblock prearms of isobutylene and another monomer connected to the opposite end of the polyisobutylene chain from the core. More importantly, the addition of certain monomers, including styrene, provides an entirely new class of compounds, i.e., star-block copolymers. Even more notable is that these compounds may be thermoplastic elastomers (TPEs) rather than simply viscosity improvers like the prior star polymers. It is believed highly desirable to provide star-block TPEs which are believed to have superior mechanical, thermal and Theological properties as compared to linear triblock TPEs or similar hard/soft segment compositions, including improved tensile strength and processing properties. Such star-block copolymers could also be synthesized as "higher order" star-block polymers in a manner similar to that described in U.S. Pat. No. 5,856,392.

SUMMARY OF INVENTION

It is, therefore, an object of the present invention to provide a star-block polymer having a plurality of well-defined, polyisobutylene-containing diblock arms radiating from a well-defined, easily characterized siloxane core.

It is another object of the present invention to provide a star-block polymer, as above, whose arm length and, hence, molecular weight may be readily determined and controlled by the sequential living cationic polymerization of isobutylene and another monomer.

It is still another object of the present invention to provide a star-block polymer, as above, which includes multiple polyisobutylene-containing diblock arms linked to a siloxane core containing at least two Si—H groups prior to linking of the diblock prearms to the core.

It is yet another object of the present invention to provide a star-block polymer, wherein the total number of arms are greater than the number of Si—H groups present on any one individual siloxane prior to linking.

It is still another object of the present invention to provide a star-block polymer, as above, which is a thermoplastic elastomer.

It is yet another object of the present invention to provide a star-block polymer which is a thermoplastic elastomer, as above, and which has superior mechanical, thermal and rheological properties as compared to linear thermoplastic elastomers having similar segment characteristics.

It is a further object of the present invention to provide a method for synthesizing multi-arm polyisobutylene-containing star-block polymers having a siloxane core.

It is still a further object of the present invention to provide a method for synthesizing higher order polyisobutylene-containing star-block polymers.

At least one or more of the foregoing objects, and possibly other aspects of the invention which will become apparent as the detailed description proceeds, are achieved by a star-block polymer comprising a core component containing at least one siloxane and a plurality of arms attached to said core component. Each of the arms of the star-block polymer is a diblock copolymer formed by the polymerization of isobutylene and a monomer other than isobutylene such that the resultant polyisobutylene end of the diblock copolymer is connected to the core component. Where properly selected "monomers other than isobutylene" are used, e.g., styrene, the resultant star-block polymer may be a thermoplastic elastomer.

Other aspects of the invention may be achieved by a method for synthesizing a star-block polymer containing a siloxane core and a plurality of diblock arms emanating from said siloxane core, comprising the steps of cationically block copolymerizing a monomer other than isobutylene, followed by isobutylene, and quenching an active polyisobutylene end to form unsaturation-functionalized, diblock prearms; and linking the diblock prearms to the siloxane core by hydrosilation.

BRIEF DESCRIPTION OF THE DRAWINGS

For a complete understanding of the objects, techniques and structure of the invention, reference should be made to the following detailed description of a preferred embodiment and the accompanying drawings wherein.

PREFERRED EMBODIMENT FOR CARRYING OUT THE INVENTION

Figure 1:
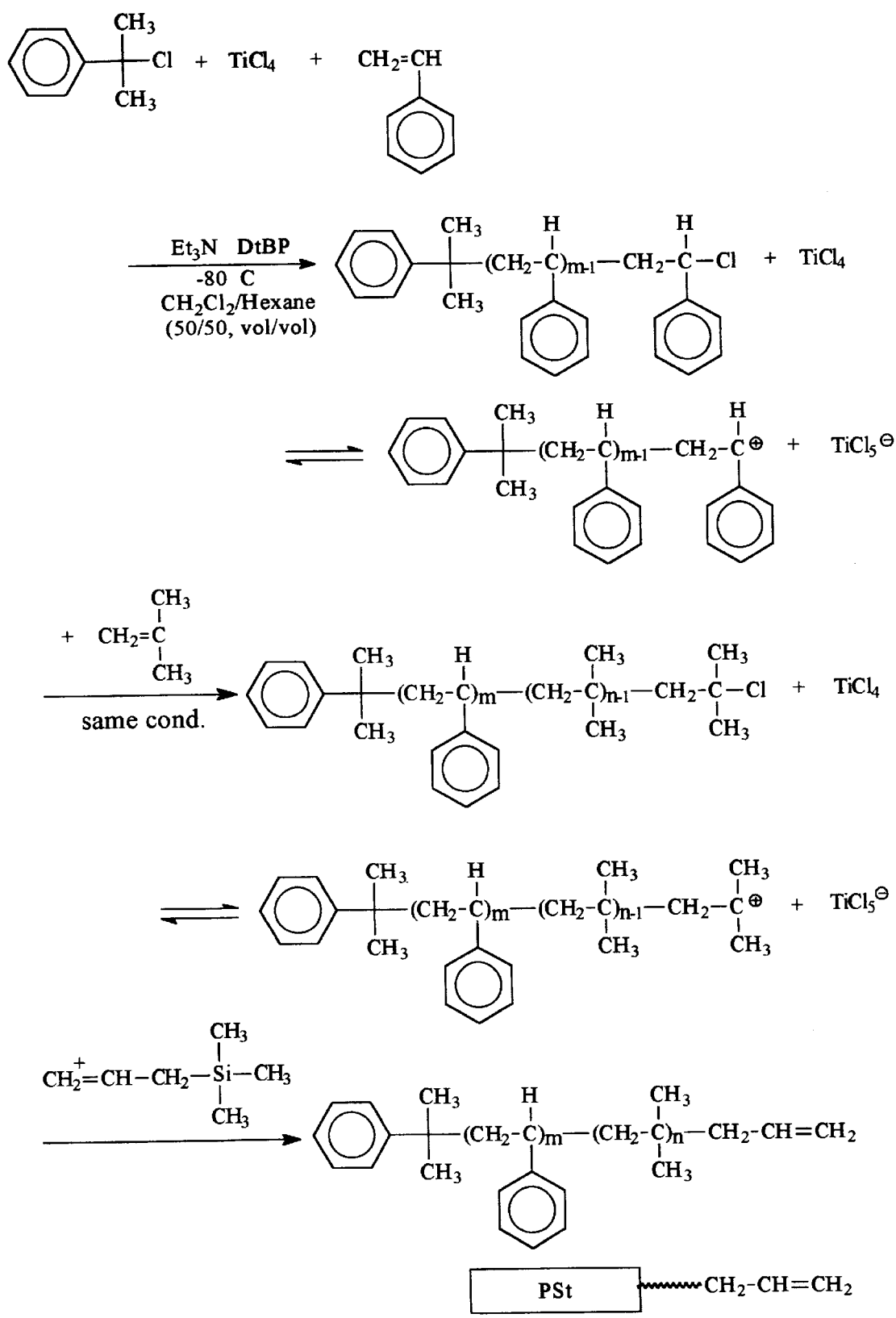
FIG. 1 is a representative schematic diagram outlining the synthesis of PSt-b-PIB prearms.

Broadly, the present invention is directed toward the synthesis of star-like polymers having multiple polyisobutylene-containing diblock copolymers, hereinafter referred to as "arms" (or "prearms" if not attached to the "core"), emanating from at least one well-defined siloxane, hereinafter referred to as the "core". Unlike earlier attempts at producing star-shaped polyisobutylenes which used crosslinked, aromatic cores such as PDVB, the present invention, like U.S. Pat. No. 5,663,245, employs well-defined, easy-to-characterize siloxane cores which yield relatively simple core architectures. In contrast to U.S. Pat. No. 5,663,245 however, the present invention employs polyisobutylene-containing diblock prearms, preferably poly(styrene-b-isobutylene) block copolymer prearms, in the formation and synthesis of the star-like polymers. Hence the term "star-block polymers" is used to describe these unique multi-arm type of compositions which, unlike the compositions disclosed in U.S. Pat. No. 5,663,245, may also be thermoplastic elastomers.

The multi-arm, polyisobutylene-based star-block copolymers prepared in accordance with the present invention are synthesized in essentially three separate steps—(1) preparation of the polyisobutylene-containing diblock prearms, (2) preparation of the siloxane core, and (3) linking the prearms to the core. Each of these steps are more particularly discussed hereinbelow with respect to the preferred embodiment for carrying out the invention in which poly(styrene-b-isobutylene) prearms are prepared. In will be appreciated however that monomer other than styrene may be used with the isobutylene monomer. Generally, any monomer other than isobutylene that can be cationically polymerized, followed by the polymerization of isobutylene in the polymer chain to form a diblock copolymer can be employed in the present invention as a suitable monomer. The polymerized segment of the diblock copolymer formed from the monomer other than isobutylene is preferably incompatible with isobutylene. Preferably, this "other" monomer is an aromatic monomer and is incompatible with polyisobutylene. Examples of preferred "other" monomers include β-pirene, norbornene, styrene and derivatives thereof, with styrene being most preferred. With respect to derivatives, styrene derivatives selected from the group consisting of p-halo styrene, p-alkyl styrene, α-methyl styrene, and indene are preferred.

Preparation of the Poly(styrene-b-isobutylene) Arms—Polymerization Step

The poly(styrene-b-isobutylene) (PSt-b-PIB) arms suitable for linking to functional siloxane cores are unsaturation-functionalized PSt-b-PIB diblock polymers of desired molecular weights. The preferred olefin-terminated PSt-b-PIB diblock arms, or "prearms" since they are not yet connected to the core, are α-tert-butyl-ω-allyl-polyisobutylenes/polystyrene copolymers (PSt-b-PIB-CC=C) or α-tert-butyl-ω-isopropenyl-polyisobutylenes (PSt-b-PIB-CC(C)=C). In either event, it will be appreciated that the PIB segment of the diblock is functionalized with unsaturation at the end of the polymer chain.

Various routes for the synthesis of PSt-b-PIB prearms may be known in the art, and any route which provides the properly functionalized PSt-b-PIB prearms will be suitable for the present invention. For instance, allyl- or isopropenyl-ended PSt-b-PIB block copolymers have been prepared by living polymerization of styrene and isobutylene to practically any lengths (and, therefore, to practically any desired molecular weight) followed by quantitative end-functionalization to the —CH$_2$CH=CH$_2$ or —CH$_2$C(CH$_3$)=CH$_2$ terminus.

With respect to the preferred embodiment, α-tert-butyl-ω-allyl-polyisobutylenes (PIB-CC=C) were prepared as follows. Styrene was polymerized by using cumyl chloride (0.31 g, 2×10$^{-3}$ mol) initiator, and TiCl$_4$ (6.8 g, 3.6×10$^{-3}$ mol) coinitiator in the present of triethylamine (TEA) (0.8 mL, 5.8×10$^{-3}$ mol) and 2,6-di-tert-butylpyridine (0.40 mL, 1.8×10$^{-3}$ mol) in mixed solvents (300 mL) of hexanes/methyl chloride (50/50, v/v) at −80° C. in a three neck 500 mL glass reactor. At about 90% conversion of styrene which equalled about 4 minutes, isobutylene was added to yield living poly(styrene-b-isobutylene). At about 100% conversion of isobutylene, i.e., after about 90 minutes, prechilled allytrimethylsilane (ATMS) (6.4 mL, 4.0×10$^{-2}$ mol) was added to quench the reaction and after approximately 1 hour of stirring the reaction was terminated with methanol. The prearms were purified by reprecipating from THF with methanol and dried in vacuo at 60° C. for more than 2 weeks. The resultant prearms were then characterized by gel permeation chromatography (GPC). This polymerization process has been characterized as an efficient process for polymerizing styrene and isobutylene. Further details of the characterization and properties of the PSt-b-PIB prearms has been provided hereinbelow.

Preparation of Siloxane Core

Siloxane cores suitable for use in conjunction with the present invention are those siloxane having functional Si—H groups somewhere in the polymer chain. It will be appreciated that the siloxane core may be linear or cyclic, and either structure is seen as being capable of providing the characteristics desired of cores for various applications, including viscosity improvers. However, cyclosiloxanes are preferred since these structures are more generally associated with and provide the optimal characteristics and/or configuration of star polymers. More preferably, the cyclosiloxane may be selected from the group consisting of alkyl-cyclosiloxane and phenyl-cyclosiloxane.

Generally, the resultant polymer stars can be synthesized by the use of various silane ring compounds having the structure:

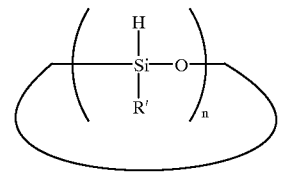

where n may be any integral number from about 2 or 3 to 20 or more, depending upon the composition desired. More preferably, n=4, 5, 6, 7, or 8. R' may be H, CH$_3$, or any other functional or nonfunctional group limited only by its usefulness to the present invention. Such structures where R'=CH$_3$ are conventionally abbreviated in the art as D$_n^H$, and are referred to hereinbelow in this manner. It will also be appreciated that An example of a preferred cyclosiloxane compound is hexamethyl-cyclohexasiloxane (D$_6^H$). D$_6^H$ may be prepared by the hydrolysis of methyldichlorosilane as is well known in the art and as is described in Curry, U.S. Pat. No. 3,484,468, the disclosure of which is incorporated by reference. The structure of D$_6^H$ is shown below.

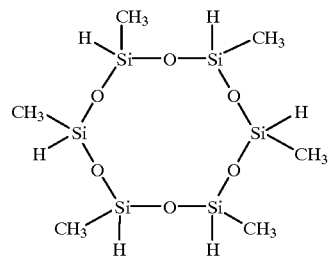

Also preferred and suitable as the siloxane core for the present invention is hydrogenoctasilsesquioxane (T$_8^H$). This cyclic compound may be prepared by the hydrolysis of trichlorosilane as is more particularly described in "New Synthetic Route to the Hydridospherosiloxanes—O$_h$—H$_8$Si$_8$O$_{12}$ and D$_5$H—H$_{10}$Si$_{10}$O$_{15}$" P. A. Agaskar, *Inorg. Chem.*, 30, 2707 (1991), the disclosure of which is incorporated herein by reference. The cubic-like structure of T$_8^H$ is shown hereinbelow.

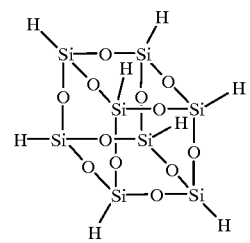

Again, it will be appreciated that the major advantage of these cyclosiloxane cores (e.g., D$_6^H$ and T$_8^H$) over those cores of PDVB is that the former cores are individual, well-defined cyclic compounds and, therefore, yield relatively simple core architectures, as compared to the complex networks created by the PDVB cores, whose characterization is practically impossible.

Linking PIB Prearms to Siloxane Core

Once the desired PSt-b-PIB prearms and siloxane cores are formed, the PIB prearms may be linked to the well-defined siloxanes containing a desirable number of Si—H functions by hydrosilation. An illustrative scheme for production of the resultant multiple PIB-arm star polymer using PSt-b-PIB-CC═C and $D_6^H$ is shown below.

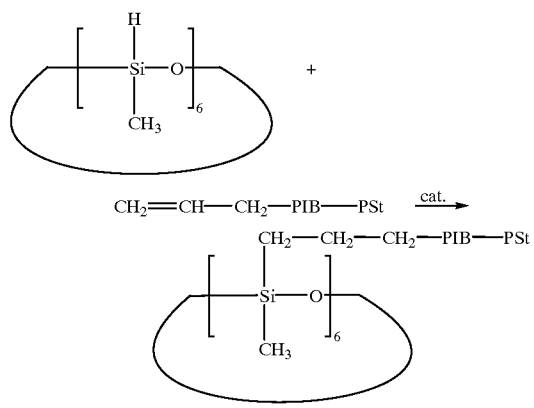

It will be appreciated that the resultant $D_6^H$+PSt-b-PIB-CC═C structure provided directly above is only one of many possible structures which could be synthesized according to the concepts of the present invention. In particular, it should be understood that the resultant composite could contain any number of Si(R')—O units where R' is shown as $CH_3$, but as noted earlier, may be any functional or non-functional group. Thus, the number 6 in the scheme above can generally be replaced with "n" which preferably equates to about 3 to 20. Furthermore, it will be appreciated that PSt-PIB block arms, as presented directly above, may include any number of repeating units of the copolymer.

The only essential requirement in linking the PSt-b-PIB prearms to the siloxane core is that the inwardly directed terminus end to be attached to the siloxane core must be an unsaturation-functionalized, preferably olefin-terminated, polyisobutylene and not a polystyrene. Essentially, any siloxane having more than one, i.e., at least two, functional Si—H groups can be used to link a plurality of polyisobutylene-polystyrene diblock copolymers having any number of repeating units to it by hydrosilation. The number of polyisobutylenes which can be linked to the siloxane core is believed to substantially equate to the number of Si—H groups available.

Moreover, the resultant structure can be a "true" star-block polymer, as would typically be the case where the siloxane used is a cyclosiloxane, or a polymeric composition based on a linear siloxane compound. In any event, it will be appreciated that the structure of the resultant composition is at least to some extent dependent upon the structure of the siloxane core.

In the synthesis of higher order star-blocks, hydrosilation of the PSt-b-PIB prearms by siloxanes having at least two, and preferably about 3 to about 20 Si—H groups as well as competitive moisture-mediated core-core coupling is involved. More particularly, higher order star-blocks, i.e., those star-block polymers having a condensed siloxane, preferably cyclosiloxane, core of more than two primary or first order star-blocks coupled together, are prepared by exploiting and controlling the rate of conversion of SiH groups to SiOH groups, thereby controlling the process of core-core coupling. Core-core coupling has been found to be dependent upon the presence of water in the system. To provide for adequate core-core coupling, the siloxane core should, at minimum, include at least two condensed siloxanes, at least one of which should include at least two SiH groups (to link to another siloxane and to link to a PSt-b-PIB prearm) prior to condensation and at least one other siloxane having at least one Si—H group (to link to the other siloxane) prior to condensation. It will be understood that at least one of the SiH groups will be convert to SiOH prior to coupling of the cores.

Returning to the preferred embodiment, a representative synthesis of a primary star-block (PSt-b-PIB-CC═C)$_m$ $(D_6^H)_n$ where m is less than or equal to 6 and n equals 1 was commenced by dissolving the PSt-b-PIB-CC═C prearm (2.0 g, 0.050 mmol) in a xylene/decane (50/50, v/v) mixture (which has been dried by refluxing over CaH2 and stored over baked BaO, water content approximately 100 ppm by Karl-Fisher titration) in a dry ampule. Hydrosilation was effected by adding the $D_6^H$ (4.1 mg, 0.011 mmol) and mixing and stirring these two components with an effective amount of $H_2PtCl_6$ (57 uL, 0.5 wt % Pt) for catalyzing the reaction to produce the resultant star polymers having multiple poly(styrene-b-isobutylene) arms emanating from the cyclosiloxane cores. This process was conducted in a sealed ampule heated to 180° C. for 3–7 days. The products were recovered by precipitation in methanol.

In order to provide higher order star-block copolymers, the prearm (2.0 g, 0.50 mol) was dissolved in xylene/decane (which had been dried by refluxing over CaH2, water content approximately 600 ppm by Karl-Fisher titration) in a dry ampule. $D_6^H$ (9.3 mg, 0.26 mmol) was then added. $H_2PtCl_6$ catalyst (114 ul, 0.5 wt % Pt) was added, the ampule sealed and heated to 180° C. for 3–7 days. The resultant star polymers having multiple poly(styrene-b-isobutylene) arms emanating from coupled cyclosiloxane cores, were recovered in the same manner as previously indicated, i.e., by precipitation in methanol.

Although the processes described were preformed in a laboratory setting, it is believed that, since hydrosilation has been demonstrated to be an essentially quantitative reaction, the subject process can be performed not only in the research laboratory, but on a commercial scale as well.

It will also be evident that preferred molecular weights for the resultant compositions will be substantially the molecular weight of the polystyrene-polyisobutylene block arms employed times the number of arms found in the composition. Of course, the core will have some molecular weight, but this is seen as insignificant as compared to the weight of the arms.

In order to demonstrate practice of the present invention, star polymers having a plurality of olefin-terminated polyisobutylene-polystyrene diblock arms linked to siloxane cores containing Si—H groups were prepared according to the concepts of the present invention, following the process(es) described hereinabove. It will be appreciated that these description were for illustrative purposes only and not meant to limit the invention, as measured by the scope and spirit of the claims.

Upon preparation of the PSt-b-PIB-$CH_2$—CH═$CH_2$ prearms and the synthesis of the star block copolymers, characterization studies of the prearms and star block copolymers were conducted. The $M_n$ and $M_w$ of the prearms and star-blocks were determined by a GPC instrument (Waters) equipped with a series of five u-Strage columns (100, 500, 10, 10, 10 A, Waters), together with a refractive index (RI) (Waters 410 Differential Refractometer), a ultraviolet (UV) (440 Absorbance Detector), and a laser light scattering (LLS) detector (Minidawn, Wyatt Technology). The dn/dc values were obtained by an Optilab instrument (Wyatt Technology). The weight average number of arms ($N_w$) was determined by dividing $M_w$, star (LLS) by $M_w$, arm (LLS). H-NMR (220 MHZ and 600 MHz) (Varian Gemini Spectrometer) analysis was used to characterize the unsaturation (allyl) functionality of prearms and the structure of star-block copolymers.

As described above, the PSt-b̲-PIB-$CH_2$—CH═$CH_2$ prearms were prepared by living cationic block copolymerization of styrene and isobutylene, followed by quantitative end-functionalization by end-quenching with ATMS. Optimum conditions to prepare PSt-b̲-PIB diblocks with relatively narrow dispersities have been developed. Thus, the synthetic strategy for the preparation of the prearms is shown in FIG. 1.

Figure 2:
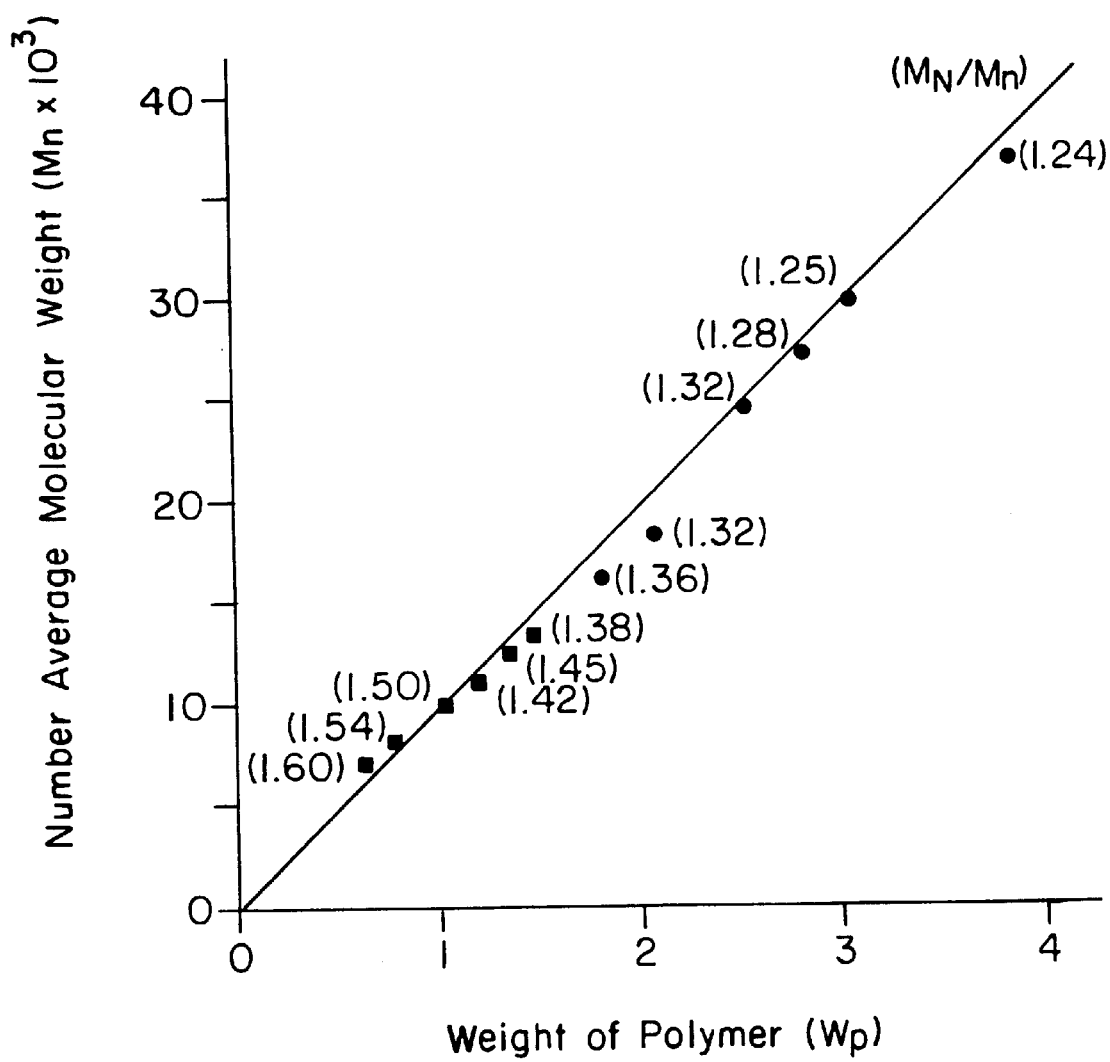
FIG. 2 is a representative graph depicting the number average molecular weight ($M_n$) compared to the weight of the polymer obtained ($w_p$) for a sequential living polymerization of styrene and isobutylene wherein the final product was PSt (15,000 g/mol)-b-PIB (25,000 g/mol)
Figure 3:
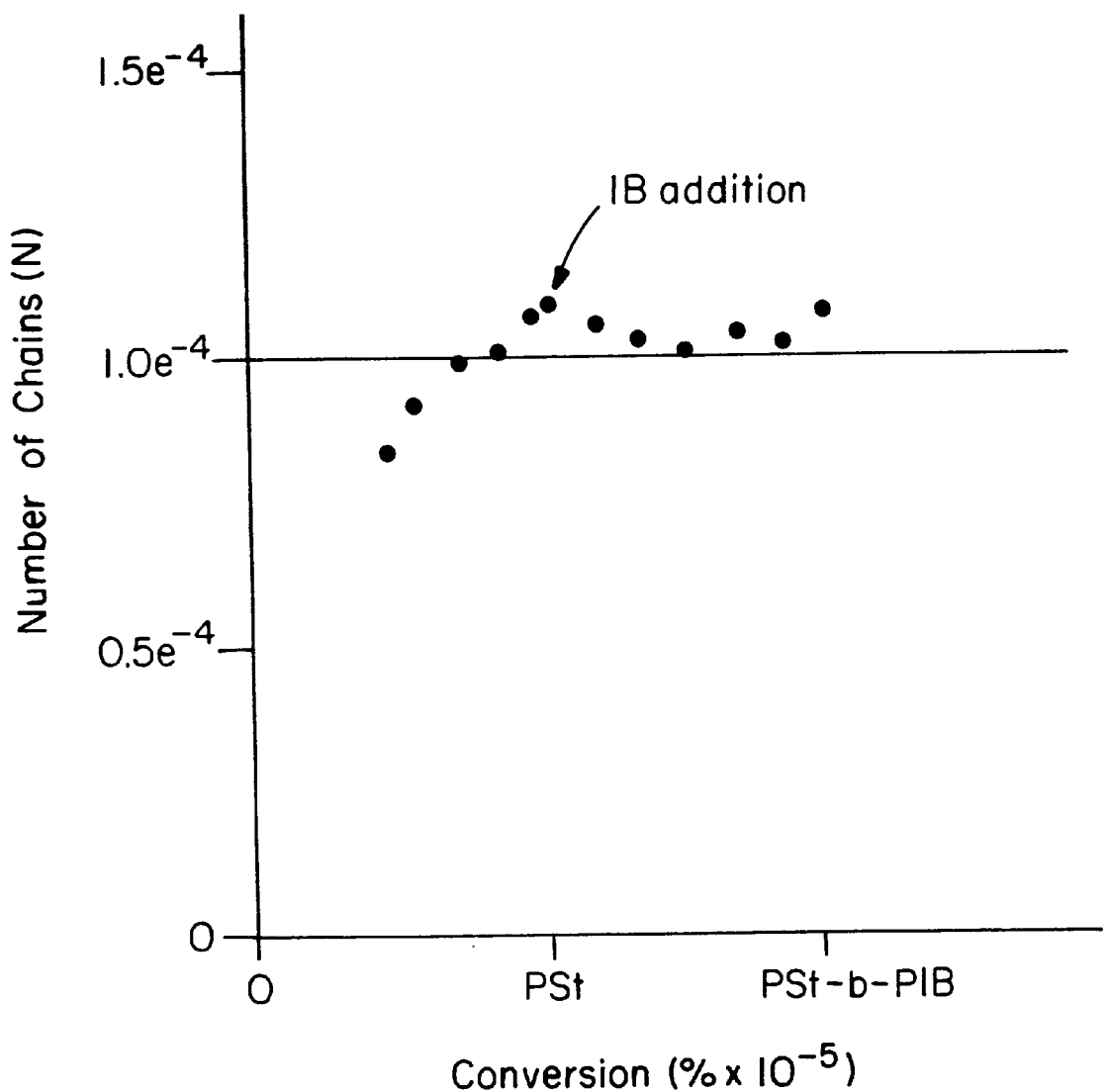
FIG. 3 is a representative graph depicting the number of chains (N) as a function of the percent PSt and PIB converted during the preparation of the PSt-b-PIB prearm.

Based upon the representative experiment, FIG. 2 shows the number average molecular weight ($M_n$) compared to the weight of the polymer obtained ($w_p$) for a sequential living polymerization of styrene and isobutylene wherein the final product was PSt (15,000 g/mol)-b-PIB (25,000 g/mol). FIG. 3 shows the number of chains (N) as a function of the percent PSt and PIB converted. Upon review of the data, it will be appreciated that the experimental points are close to the theoretical solid line indicating that the block copolymerization was living. The $M_n$'s of Pst and PIB moieties of the prearms were Pst(8,900 g/mol)-b̲-PIB(30,000 g/mol). The $M_w/M_n$ of the prearm was 1.24. The $M_w$ by LLS was 48,2000 g/mol. The average allyl end-functionality was 0.95 by H-NMR spectroscopy.

Figure 4:
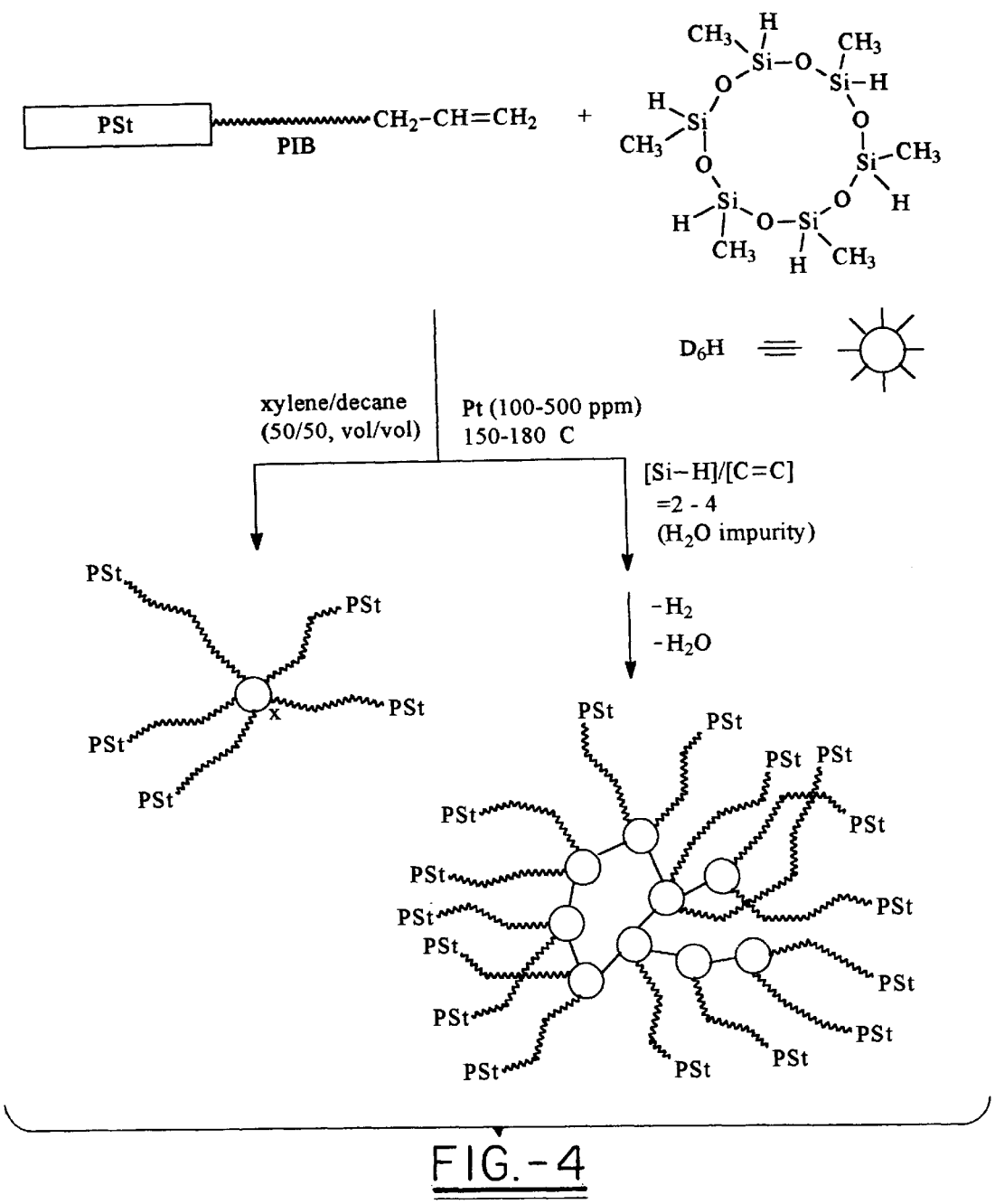
FIG. 4 is a representative schematic diagram outlining the synthesis of both the primary star block and the higher order star block.

In the synthesis of the star-block copolymers, primary star-blocks were obtained by the use of [Si═H]/[C═C]=1.1 to 1.2. (A slight stoichiometric excess of cyclosiloxane over the prearm was used to compensate for the possible present of Si—OH groups arising from Si—H groups in the presence of adventitious water). For the higher order star-blocks, the ratio of [Si—H]/[C═C] was equal to or greater than 2. A representative synthetic strategy for obtaining the star-block copolymers of the present invention are set forth in FIG. 4 as was outlined above.

Figure 5:
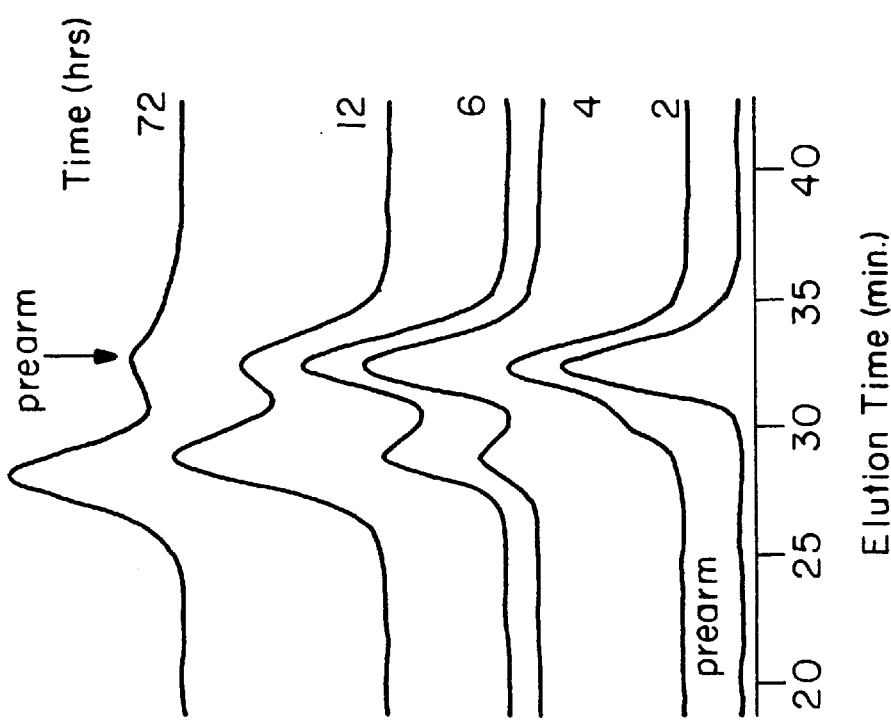
FIG. 5 is a set of gel permeation chromatographs of a trace of the refractive index (RI) of the primary star polymer prepared in accordance with the concepts of the present invention over several hours.

In characterizing the resultant primary star-block copolymer, FIG. 5 shows the GPC/RI traces obtained for the linking of PSt(8,900 g/mol)-b̲-PIB(30,000 g/mol)-CH2—CH═CH2 with $D_6^H$ under the reaction conditions of using 0.05 mmol prearm, 0.01 mmol siloxane, 100 ppm Pt catalyst, 5.0 mL xylene/decane, 160° C. As shown in FIG. 5, the presence of the primary star-block is evident from the shoulder at approximately 29 minutes elution time in the RI trace obtained after 2 hours. With increasing time, this shoulder grows into a separate peak (See RI trace obtained after 4 hours), and after 72 hours, at approximately 82% conversion of the prearms, the reaction predominantly yields primary star-block (See RI trace obtained after 72 hours). The $M_w$ of this product was 250,200 g/mol (by LLS) so that $N_w$=5.2. The weight fraction of siloxane cores in the star-block was negligible and was neglected in calculating $N_w$.

Figure 6:
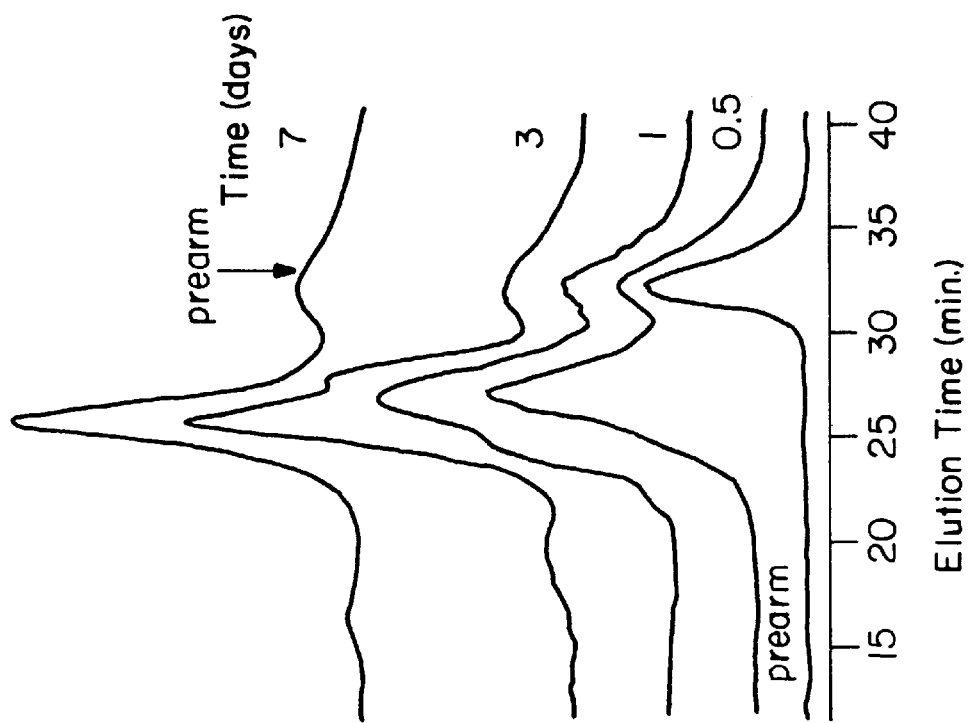
FIG. 6 is a set of gel permeation chromatographs of a trace of the refractive index (RI) of the high order star polymer prepared in accordance with the concepts of the present invention over several hours.

In characterizing the resultant higher order star-block, FIG. 6 shows the RI traces obtained by using [Si—H]/[C═C]=3 and under the reaction conditions of using 0.05 mmol prearm, 0.025 mmol siloxane, 200 ppm Pt catalyst, and 6.5 mL xylene/decane, at 180° C. The presence of higher order star-block copolymers can be clearly seen (peak at approximately 26 minutes elution time) in the RI trace obtained after 0.5 day of linking. With increasing time (e.g., 1 day), the presence of the shoulder at approximately 24 minutes elution time indicates the formation of higher order star-block. In the RI trace obtained after 7 days of reaction this shoulder grew into the main peak at approximately 91% prearm conversion, and the presence of predominantly higher order star-blocks with Mw=886,000 and $N_w$=18.4 is indicated. It is postulated that the water impurity in the charge reacted with the Si—H groups of the cyclosiloxane and led to core-coupled star-blocks as described by Omura and Kennedy in *Macromolecules* 1997, 30, 3204.

An investigation into the mechanical, thermal and theological properties of these novel star-blocks and a comparison between select properties of star-blocks and linear triblock TPEs of similar hard/soft segment compositions was also conducted. Star-blocks for this investigation were prepared in accordance with the concepts of the present invention and as described hereinabove. A representative synthesis of a PSt-b-PIB-b-PSt (specifically that of PSt(13)-b-PIB(80)-b-PSt(13)) was as follows: IB (80.0 g, 1.43 mol) was polymerized by a dicumyl chloride (DiCumCl, 0.19 g, 1.0×10⁻³ mol)/$TiCl_4$(3.42 g, 1.82×10⁻² mol)/TEA (0.49 mL, 3.0×10⁻³ mol)/DtBP (0.40 mL, 1.8×10⁻³ mol)/hexanes/methylene chloride (60/40, v/v) (360 mL)/−80° C. system in a three neck 1000 mL glass reactor in the drybox under $N_4$. At about 90% IB conversion (after about 90 min), St (26.1 g, 0.25 mol) was added to the bidirectionally living ⊕PIB⊕ to yield ⊕PSt-b-PIB-b-PSt⊕. At about 100% St conversion (after ~30 min), the product was precipitated by prechilled MeOH and purified by repeated precipitations from THF into MeOH. PIB and PSt contaminations were extracted using hexanes and MEK, respectively, and the products were characterized by published techniques. Diblock contamination was virtually nonexistent upon analysis of the resultant triblock products.

The number of arms ($N_{w,arm}$) of star-blocks was calculated by $M_{w,star}/M_{w,arm}$ as known in the art. PSt/PIB block compositions of triblocks and star-blocks were characterized by ¹H-NMR (varian Gemini Spectrometer, 200 and 600 MHz) spectroscopy. The thermal stability of primary and higher-order star-blocks was determined by using a thermogravimetric analyzer (TGA, TA Instruments, model Hi-Res TGA 2950) under $N_2$ by heating from ambient to 600° C. with 10° C./min. Tensile properties of select triblock and star-block samples at elevated temperatures were measured by an Instron 1130 equipped with a temperature-controlled chamber with $N_2$ purging. Samples were compression molded for 30 min at 180° C. at 10,000 psi and cooled slowly (about 1° C./min). A few THF solvent cast samples were also prepared for comparison purposes. Dynamic melt viscosity was determined at 180 and 210° C. by the use of a rheometric mechanical spectrometer (RMS, Rheometrics, model 800) with parallel plate arrangement. Circular samples (about 2 mm thick, 2 cm diameter) were cut from molded films. Dynamic viscosities of these samples were measured in the frequency range of 0.01–100 rad/s.

As a result of this tests, select mechanical, thermal, and processing properties of the novel star-block TPEs were determined and compared with those of linear triblock TPEs having similar hard/soft segment compositions. Generally, the molecular characteristics, mechanical properties, and dynamic melt viscosities of star-blocks were superior to those of the select linear triblocks. Specifically, general characteristics, such as molecular weights, dispersities, the number of arms ($N_{w,arm}$) of the products investigated. No effort was made to remove any diblock impurities from the products. For comparison purposes linear triblocks and star-blocks with approximately the same PSt/PIB arm molecular weights were prepared. The molecular weight of the PSt segment, $M_{n,PSt}$ was larger than 5,000 g/mol since PSt/PIB phase separation was reported to start at $M_{n,PSt}$ about 5,000 g/mol. However, the $M_{n,PSt}$ could not be increased beyond 20,000 g/mol since the longer prearms would be too slow to link. The hard/soft segment compositions of star-blocks were in the 20–40 wt % PSt range so that phase separation of dispersed PSt domains in the PIB matrix should arise.

With respect to the mechanical property data acquired, the tensile properties and elongation of star-blocks were markedly superior to those of the linear TPEs with comparable arm compositions and molecular weights; for example, the higher-order star-block $(D_6)_8[PIB(33)-PSt(12)]_{16}$ exhibits about 24 MPa tensile strength while that of the linear counterpart, PSt(13)-b-PIB(80)-b-PSt(13), reaches only about 16 MPa (note that the molecular weights and wt % PSt in the products are quite close: $M_{n,PSt}$=12 and 13K; PSt=27 and 28 wt %). In fact, the tensile strength of the star-block of the present invention is even higher than that of PSt(22)-b-PIB(120)-b-PSt(22), i.e., a linear triblock TPE with much higher $M_{n,PSt}$.

The mechanical properties of star-blocks also appear to exhibit higher tolerance toward diblock contamination than linear triblocks. While the tensile properties of star-blocks were in the 20–25 MPa range in the presence of 10–15% diblock contaminants, the tensile strengths of the triblocks of similar $M_{n,PSt}$ and containing about 5% diblock (assumed from the peak deconvolution technique) were much lower (e.g., $(D_6)_8[PIB(33)-PSt(12)]_{16}$ exhibited about 24 MPa, whereas PSt(13)-b-PIB(80)-b-PSt(13) reached only about 16 MPa). Both the hardness (shore A) and the strength of triblock and star-block copolymers increased with increasing PSt content. These enhanced properties are most likely due to the increased size of glassy domains.[8] Permanent set values of triblocks were in the range of 1–3%, while those of star-blocks were in the range of 3–9%. Diblock contamination as a percentage was estimated by the relative peak area of star-blocks and unreacted diblock arms from RI (GPC) analysis.

Figure 7:
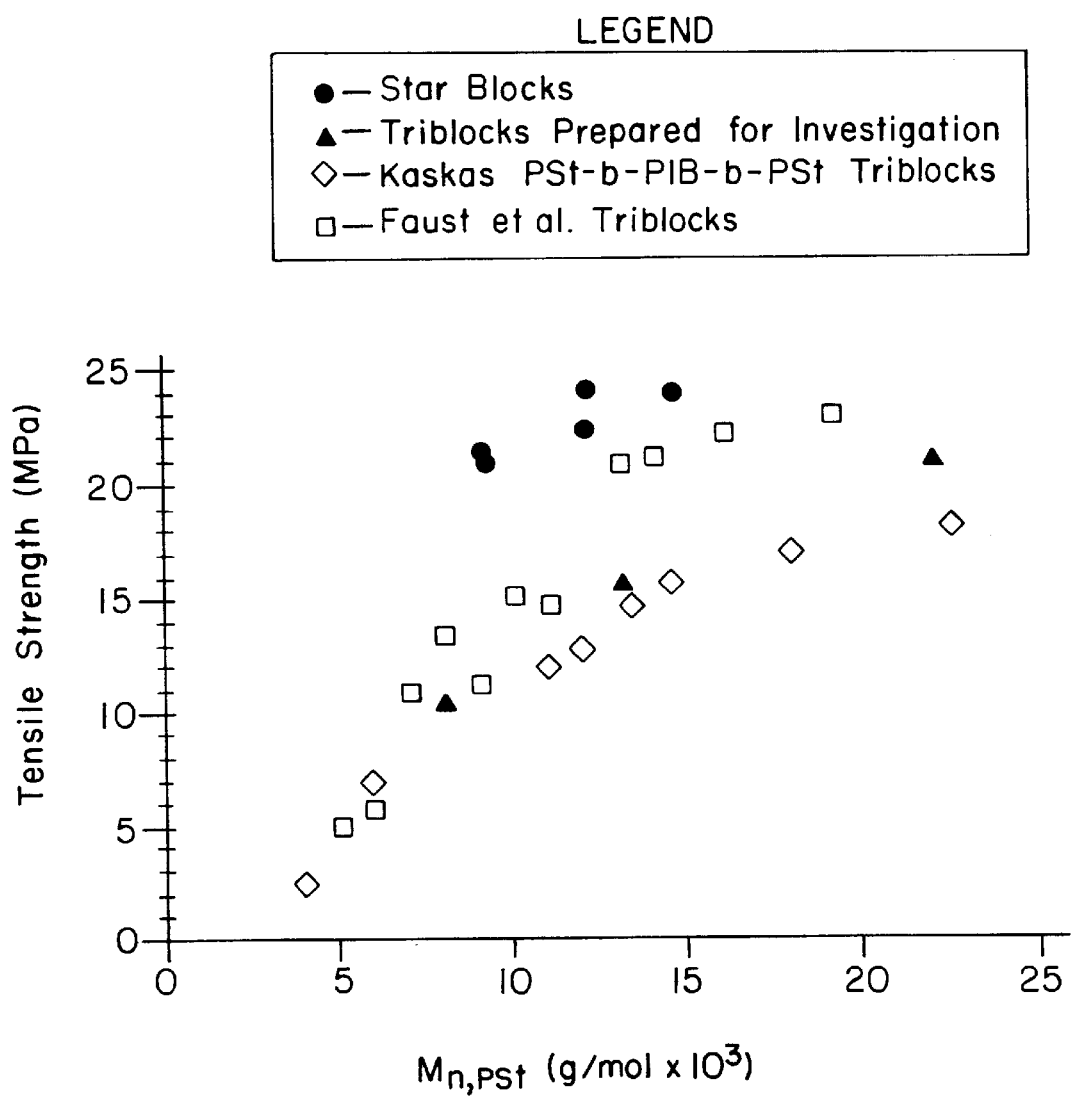
FIG. 7 is a representative graph depicting the tensile strengths, in MPa, of a series of triblocks and star-blocks as a function of the molecular weight of PSt segments ($M_{n,PSt}$), in g/mol.

FIG. 7 shows the tensile strengths of star-blocks and linear triblocks prepared in this research, together with those of linear triblocks published by Kaszas and Faust et al., as a function of the $M_n$ of the PSt segments ($M_{n,PSt}$) in these TPEs. (Kaszas, Polym. Mater. Sci. Eng., 1993, 68, pg. 325: Faust et al., J. Macromol. Sci.—Pure Appl. Chem., 1994, A31 (12), pg. 2055). It is well-known that the tensile strength of triblocks increases with $M_{n,PSt}$ and that it levels off at 20–25 MPa when the $M_{n,PSt}$ reaches about 15,000 g/mol. As shown by the data in FIG. 7, the tensile strengths of star-blocks are significantly higher than those of the linear triblocks at the same $M_{n,PSt}$ level. For example, the higher-order star-block $(D_6)_{14}[PIB(30)-PSt(9)]_{21}$ with $M_{n,PSt}$=9,000 g/mol shows about 20 MPa tensile strength, whereas the linear triblocks PSt(8)-b-PIB(120)-b-PSt(8) with a similar $M_{n,PSt}$ of about 8,000 g/mol reaches only about 10 MPa. In order to reach about 20 MPa tensile strength, the Mn,PSts of the linear triblocks prepared in this work were are least about 20,000 g/mol.

The tensile strengths of star-blocks and linear triblocks were investigated in the 25–100° C. temperature range. It is noted that the tensile strength of all the products declined rapidly with increasing temperatures; however, the multiarm star-blocks maintained their strength to much higher temperature levels than the linear triblocks. This phenomenon was particularly evident with the higher-order star-blocks. For example, at about 60° C. the tensile strength of the star-block $(D_6)_8[PIB(33)-PSt(12)]_{16}$ was about 10 MPa whereas that of the linear triblock PSt(13)-b-PIB(80)-b-PSt (13), with about the same arm $M_{n,PSt}$, was below about 3 MPa.

As noted, recent interest in star-based polymers is high because of their advantageous Theological properties (low viscosities). Several groups have found that very high molecular weight stars exhibit quite low melt viscosities. Thus, star-block copolymers show not only superior mechanical properties to those of their linear counterparts but also relatively low viscosities which in turn would suggest improved processibility.

Figure 8:
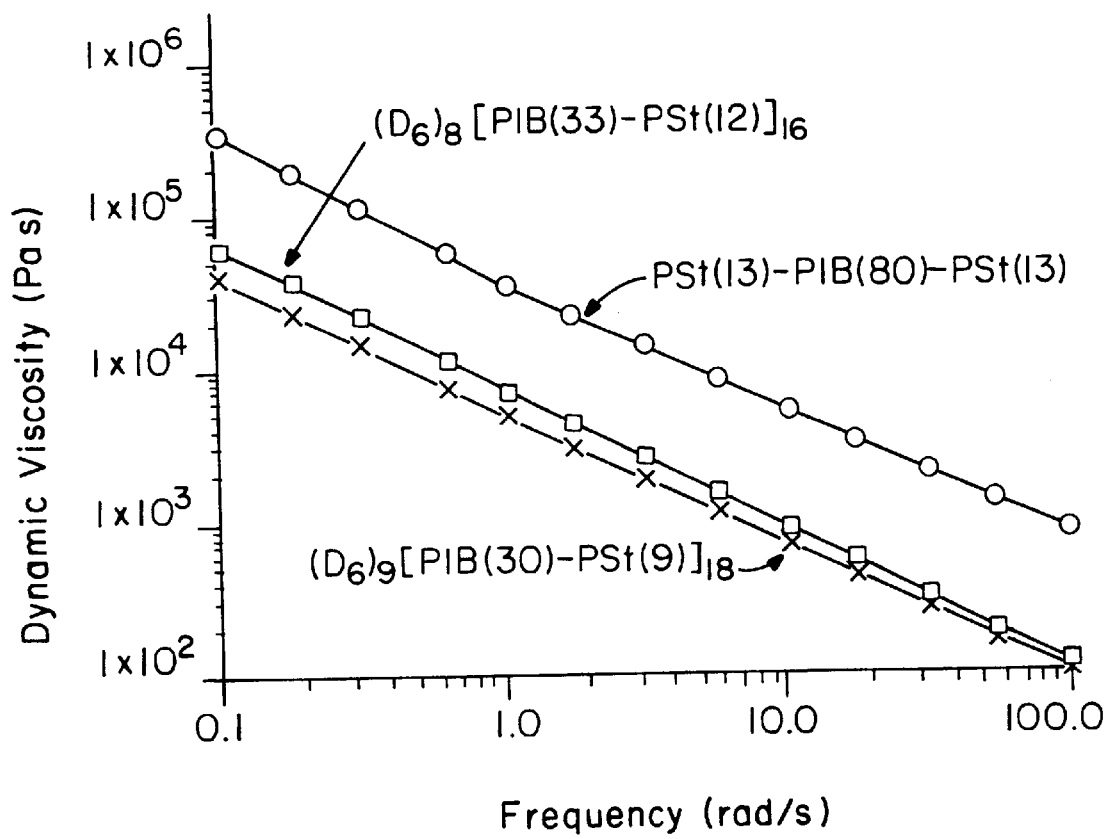
FIG. 8 is a representative graph depicting dynamic melt viscosities of select triblock and star-block samples as a function of frequencies at 210° C.

Investigations regarding the dynamic melt viscosity of select star-block copolymers were studied and compared with data obtained with linear triblocks of similar PSt/PIB compositions (arm molecular weights). FIG. 8 shows the data. The dynamic melt viscosities of both species show non-Newtonian behavior and decrease with increasing oscillation frequency. This rheological behavior is believed due to the phase separated domain structure of both types of copolymers which survives even in the melts. The melt viscosity of these block copolymers is higher at lower shear frequencies. By increasing the frequency of shearing (i.e., by putting more energy into the system and disrupting the domains), the activation energy for the PSt domains to flow through the incompatible PIB matrix is overcome and the melt viscosity decreases. At higher frequencies the melt rheology of the block copolymers is mainly determined by chain entanglements of the relatively long PIB segments.

Thus it have been found that the complex (melt) viscosity of the star-block $(D_6)_8[PIB(33)-PSt(12)]_{16}$ was substantially lower than that of the linear triblock PSt(13)-PIB(80)-PSt (13) over the entire frequency range investigated. It has further been found that the melt viscosity of similar polydiene-based star-blocks is controlled by the relative PSt content and is determined by the molecular weight of the arms rather than by the number of arms. Consistent with this finding, the investigation has also found that the melt viscosity of $(D_6)_{14}[PIB(30)-PSt(9)]_{21}$ was lower than that of $(D_6)_8[PIB(33)-PSt(12)]_{16}$, i.e., for a star-block that contained the lower amount of PSt (23 vs. 27 wt %) and higher number of arms (21 vs. 16).

It should thus be evident that the methods of the present invention are highly effective in synthesizing multi-arm star-block copolymers with PSt-b-PIB arms radiating from siloxane, and preferably, cyclosiloxane cores. The invention is particularly suited for cyclosiloxanes, but is not necessarily limited thereto. The synthesis embraces the use of sequential living block polymerization of styrene and isobutylene, end-quenching by ATMS, and linking by hydrosilation with $D_n^H$, where n is most preferably 6. It will be appreciated however that monomer other than styrene may be employed with isobutylene in the production of the star-block polymers.

Such multi-arm star-block polymers are seen as having particular utility as thermoplastic elastomers and the like, although it will be appreciated that the subject star-block polymers may be readily useful in a variety of applications, including the manufacture of other materials as well. In the presence of adventitious trace of water in the synthesis charge, a parasitic reaction may occur which gives rise to higher order star-block polymers by star-star, or core-core coupling. If desired, such higher order star-block polymers can be prepared by the use of higher [Si—H]/[C═C] ratios.

Based upon the foregoing disclosure, it should now be apparent that the novel star-block polymers described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, siloxanes employed according to the present invention are not necessarily limited to cyclosiloxanes. Moreover, the polyisobutylene-containing block arms of the present invention may be prepared using monomers other than styrene, (but not isobutylene alone) based upon a variety of methods. Thus, the scope of the invention shall include all modifications and variations that may fall within the scope of the attached claims.

What is claimed is:

1. A star-block polymer comprising:
    a core component containing at least one siloxane; and
    a plurality of arms attached to said core component, wherein each of said arms is a diblock copolymer formed by the polymerization of isobutylene and a monomer other than isobutylene such that a resultant polyisobutylene end of said diblock copolymer is connected to said core component.

2. The star-block polymer according to claim 1, wherein said at least one siloxane is a cyclosiloxane.

3. The star-block polymer according to claim 2, wherein said cyclosiloxane is selected from the group consisting of alkyl-cyclosiloxane and phenyl-cyclosiloxane.

4. The star-block polymer according to claim 1, wherein said core component contains at least two condensed siloxanes prior to attachment of said arms, at least one of said siloxanes having at least two Si—H groups prior to condensation and at least one other of said siloxanes having at least one Si—H group prior to condensation.

5. The star-block polymer according to claim 1, wherein said monomer other than isobutylene is an aromatic monomer.

6. The star-block polymer according to claim 1, wherein said monomer other than isobutylene is selected from the group consisting of β-pirene, norbornene, styrene and derivatives thereof.

7. The star-block polymer according to claim 1, wherein a polymerized segment of said diblock copolymer formed from said monomer other than isobutylene is incompatible with polyisobutylene.

8. The star-block polymer according to claim 6, wherein said monomer other than isobutylene is styrene.

9. The star-block polymer according to claim 6 wherein said derivatives are styrene derivatives selected from the group consisting of p-halo styrene, p-alkyl styrene, α-methyl styrene, and indene.

10. The star-block polymer according to claim 1 wherein said diblock copolymer arms are poly(styrene-b-isobutylene).

11. A thermoplastic elastomer comprising the star-block polymer of claim 1.

12. The thermoplastic elastomer according to claim 11, wherein said monomer other than isobutylene is an aromatic monomer.

13. The thermoplastic elastomer according to claim 11, wherein a polymerized segment of said diblock copolymer formed from said monomer other than isobutylene is incompatible with polyisobutylene.

14. The thermoplastic elastomer according to claim 12, wherein said monomer other than isobutylene is styrene.

15. The thermoplastic elastomer according to claim 11, wherein said thermoplastic elastomer has a higher tensile strength than linear triblock polymer of similar characteristics.

16. The thermoplastic elastomer according to claim 11, wherein said thermoplastic elastomer has a lower viscosity than a linear triblock polymer of similar characteristics.

17. A method for synthesizing a star-block polymer containing a siloxane core and a plurality of diblock arms emanating from said siloxane core, comprising the steps of:
    cationically block copolymerizing a monomer other than isobutylene, followed by isobutylene, and quenching an active polyisobutylene end to form unsaturation-functionized, diblock prearms; and
    linking said diblock prearms to the siloxane core by hydrosilation.

18. The method according to claim 17, wherein the siloxane core is selected from the group consisting of cyclosiloxanes.

19. The method according to claim 17, wherein the siloxane core contains at least two condensed siloxanes prior to linking, at least one of said siloxanes having at least two Si—H groups prior to condensation and at least one other of said siloxanes having at least one Si—H group prior to condensation.

20. The method according to claim 17, wherein said monomer other than isobutylene is selected from the group consisting of β-pirene, norbornene, styrene and derivatives thereof.

21. The method according to claim 20, wherein said monomer other than isobutylene is styrene.

22. The method according to claim 17, wherein the diblock prearms are poly(styrene-b-isobutylene).

23. The method according to claim 19, further comprising the step of increasing the ratio of Si—H groups of said siloxanes to unsaturation groups of said polyisobutylene so as to provide core-core coupling.

24. The method according to claim 23, wherein said step of increasing the ratio of Si—H groups of said siloxane to unsaturation groups of said polyisobutylene includes the step of providing water to convert a fraction of the Si—H groups of said siloxanes to Si—OH groups and reacting said Si—OH groups with one of said Si—H groups or said Si—OH groups of at least one other siloxane.

* * * * *